Figure 1:
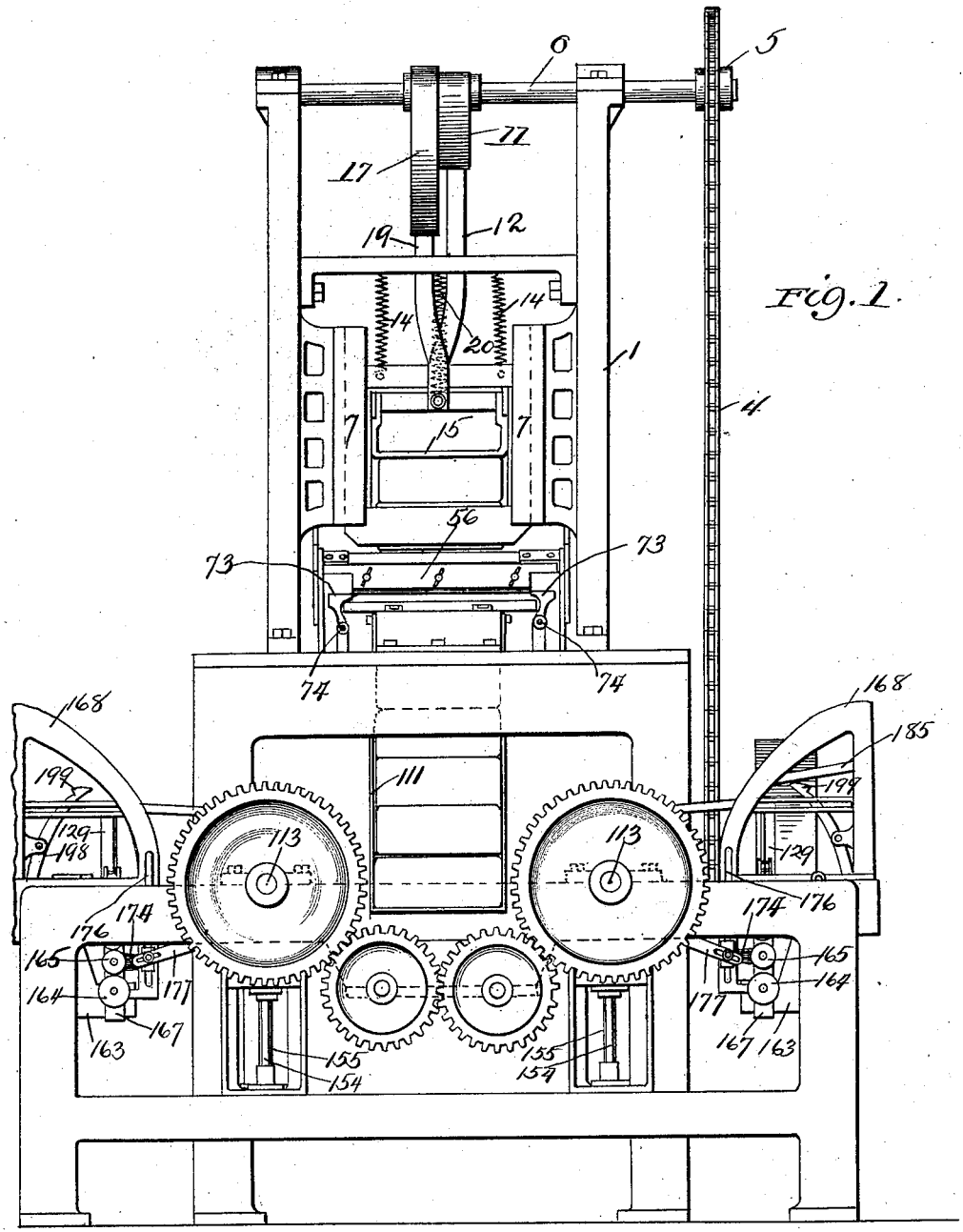

No. 753,661. PATENTED MAR. 1, 1904.
D. F. BREMNER, Jr.
MACHINE FOR WRAPPING PACKAGES.
APPLICATION FILED APR. 25, 1900.
NO MODEL. 12 SHEETS—SHEET 5.

No. 753,661. PATENTED MAR. 1, 1904.
D. F. BREMNER, Jr.
MACHINE FOR WRAPPING PACKAGES.
APPLICATION FILED APR. 25, 1900.
NO MODEL. 12 SHEETS—SHEET 6.

Witnesses:
Inventor:
David F. Bremner Jr.,
By Offield, Towle & Linthicum
Attys

No. 753,661. PATENTED MAR. 1, 1904.
D. F. BREMNER, Jr.
MACHINE FOR WRAPPING PACKAGES.
APPLICATION FILED APR. 25, 1900.
NO MODEL. 12 SHEETS—SHEET 7.
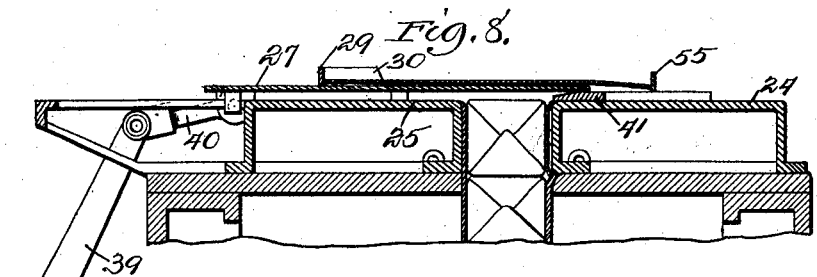
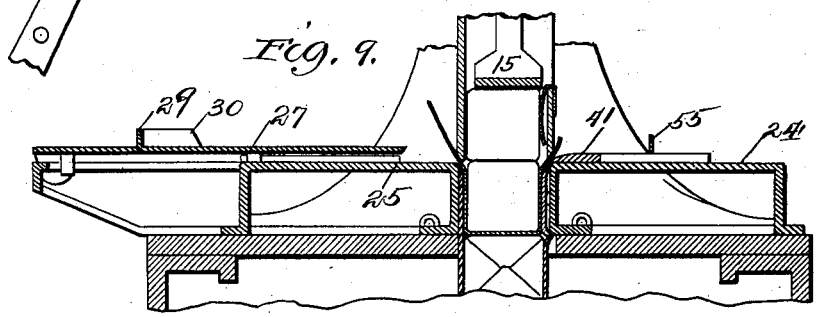
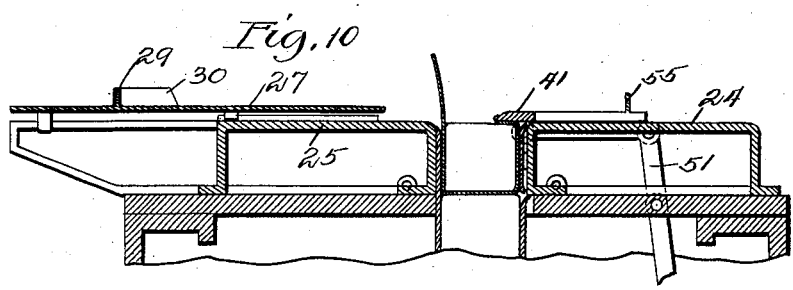
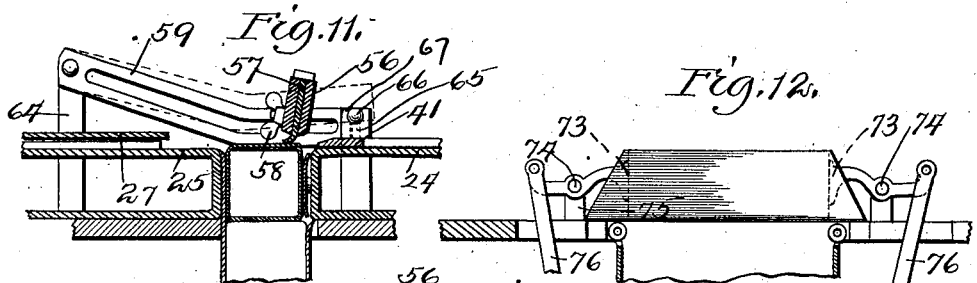
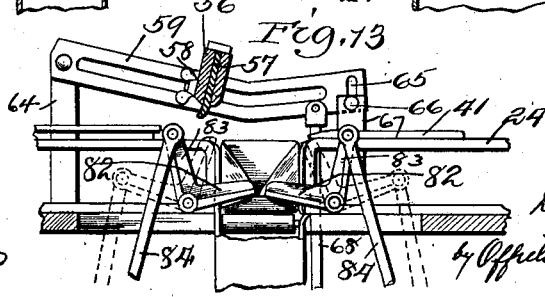

No. 753,661. PATENTED MAR. 1, 1904.
D. F. BREMNER, Jr.
MACHINE FOR WRAPPING PACKAGES.
APPLICATION FILED APR. 25, 1900.
NO MODEL. 12 SHEETS—SHEET 8.

Witnesses:
JB Weir
Ira D Perry

Inventor:
David F. Bremner Jr.
By Offield, Towle & Linthicum, Attys

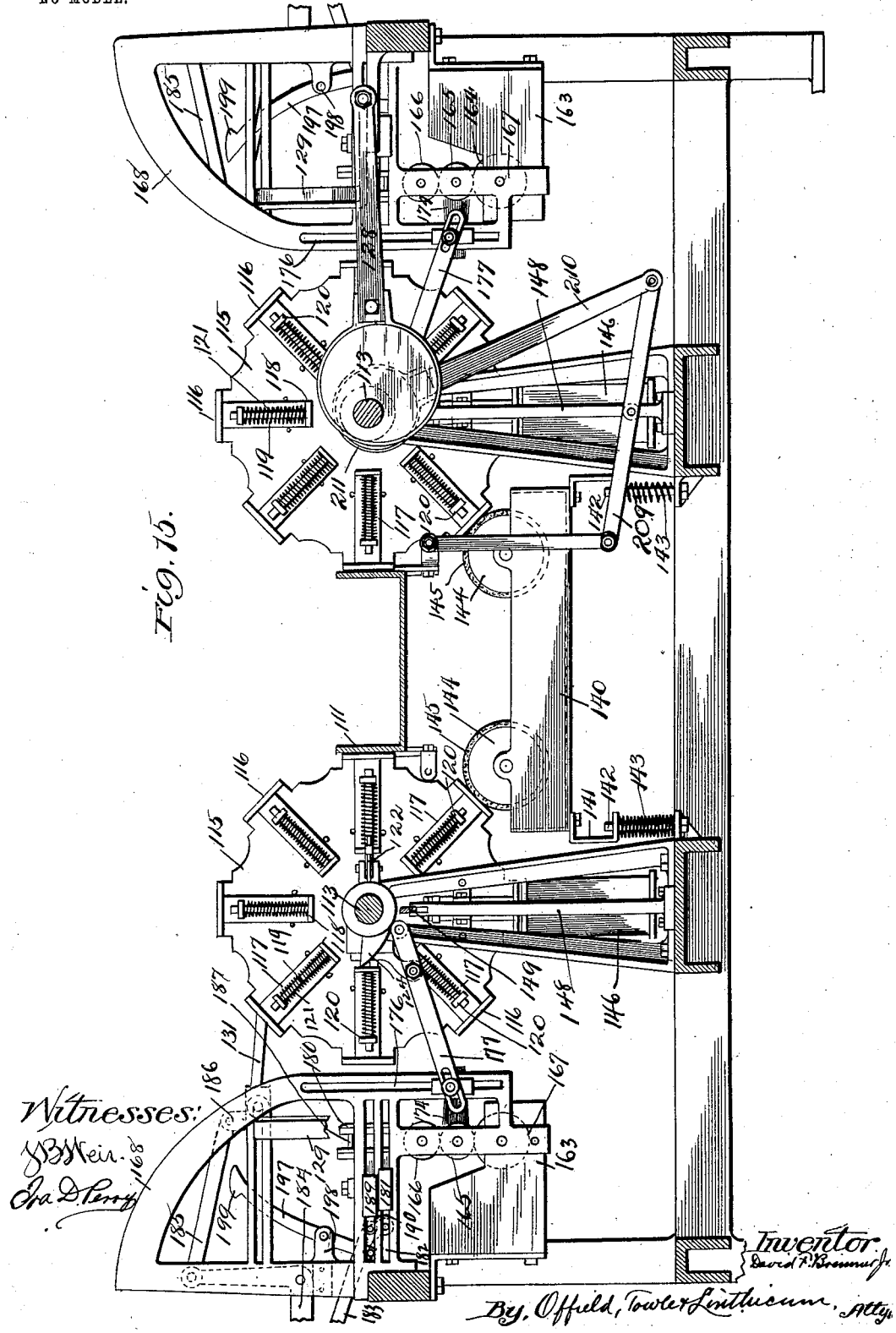

No. 753,661. PATENTED MAR. 1, 1904.
D. F. BREMNER, Jr.
MACHINE FOR WRAPPING PACKAGES.
APPLICATION FILED APR. 25, 1900.
NO MODEL. 12 SHEETS—SHEET 10.
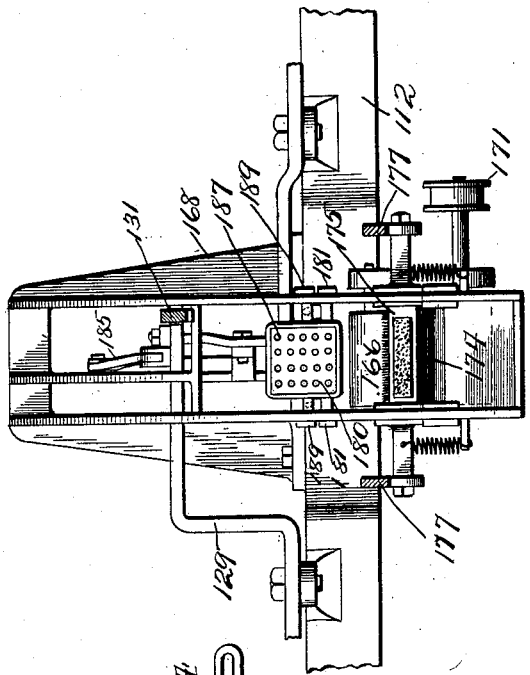
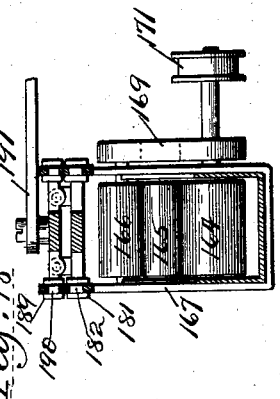
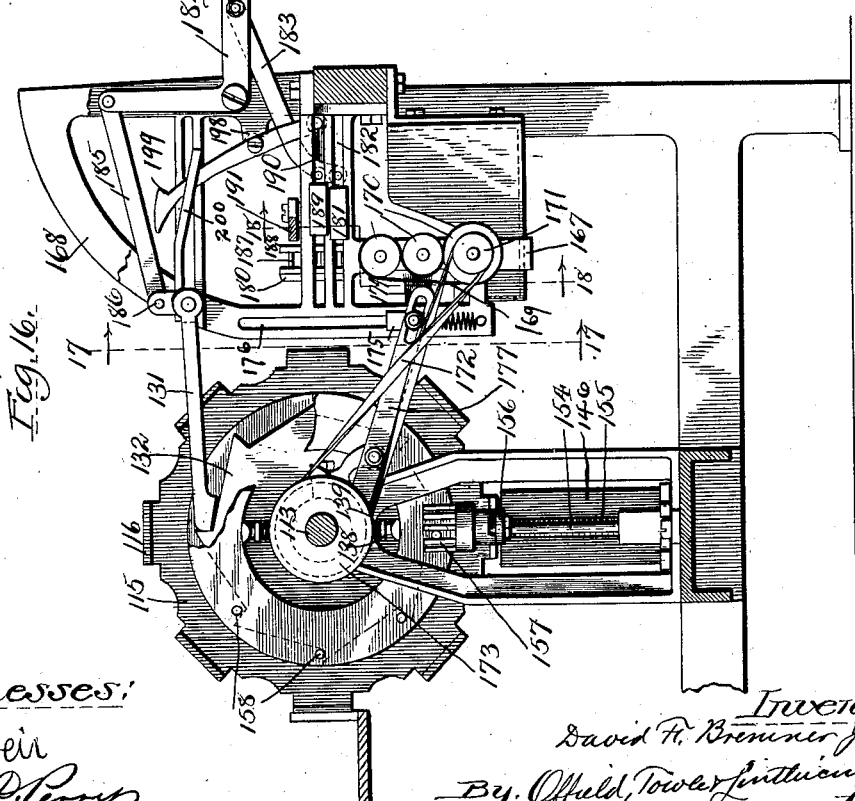
Witnesses: Inventor
David F. Bremner Jr.,
By Offield, Towle & Linthicum,
Attys.

No. 753,661. PATENTED MAR. 1, 1904.
D. F. BREMNER, Jr.
MACHINE FOR WRAPPING PACKAGES.
APPLICATION FILED APR. 25, 1900.
NO MODEL. 12 SHEETS—SHEET 11.
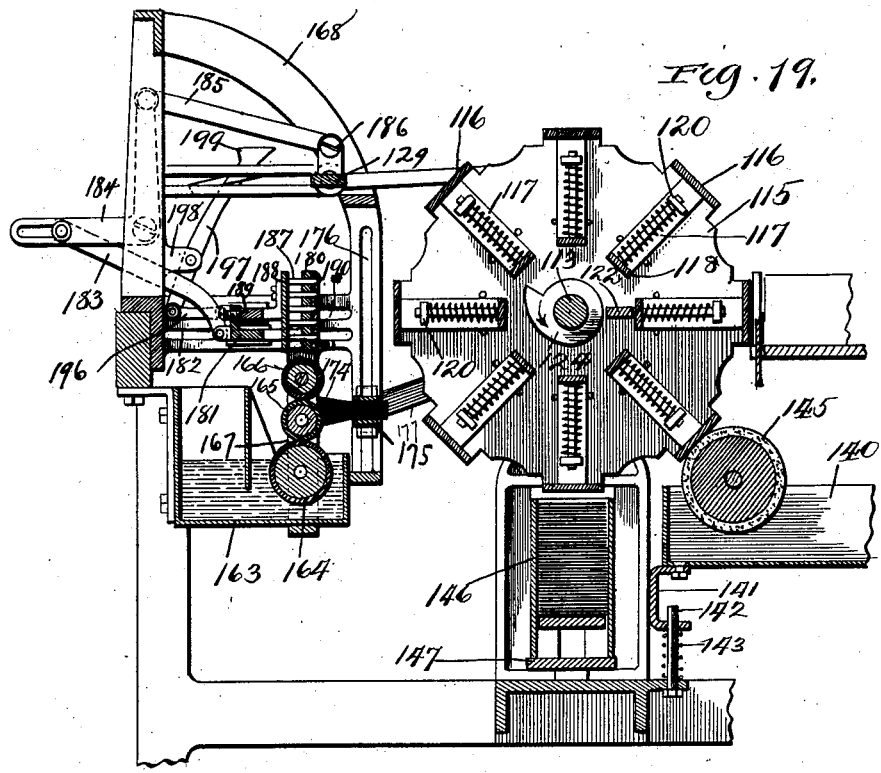
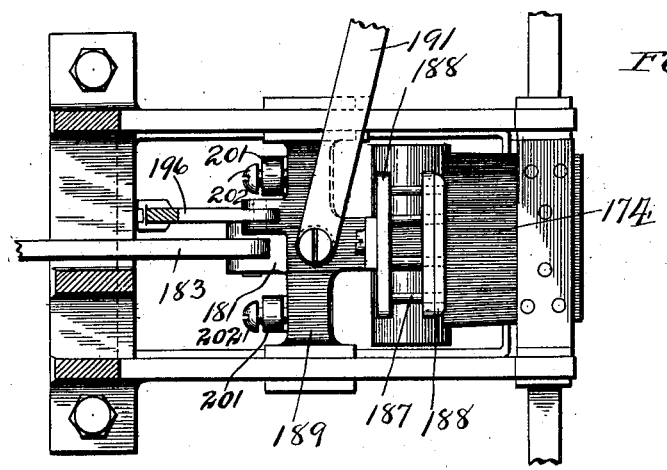
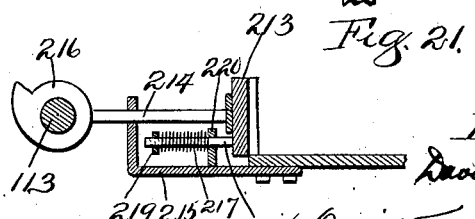
Witnesses: Inventor:
J. B. Weir David F. Bremner Jr.
Ira D. Perry By Offield, Towle & Linthicum
Attys.

No. 753,661. PATENTED MAR. 1, 1904.
D. F. BREMNER, Jr.
MACHINE FOR WRAPPING PACKAGES.
APPLICATION FILED APR. 25, 1900.
NO MODEL. 12 SHEETS—SHEET 12.
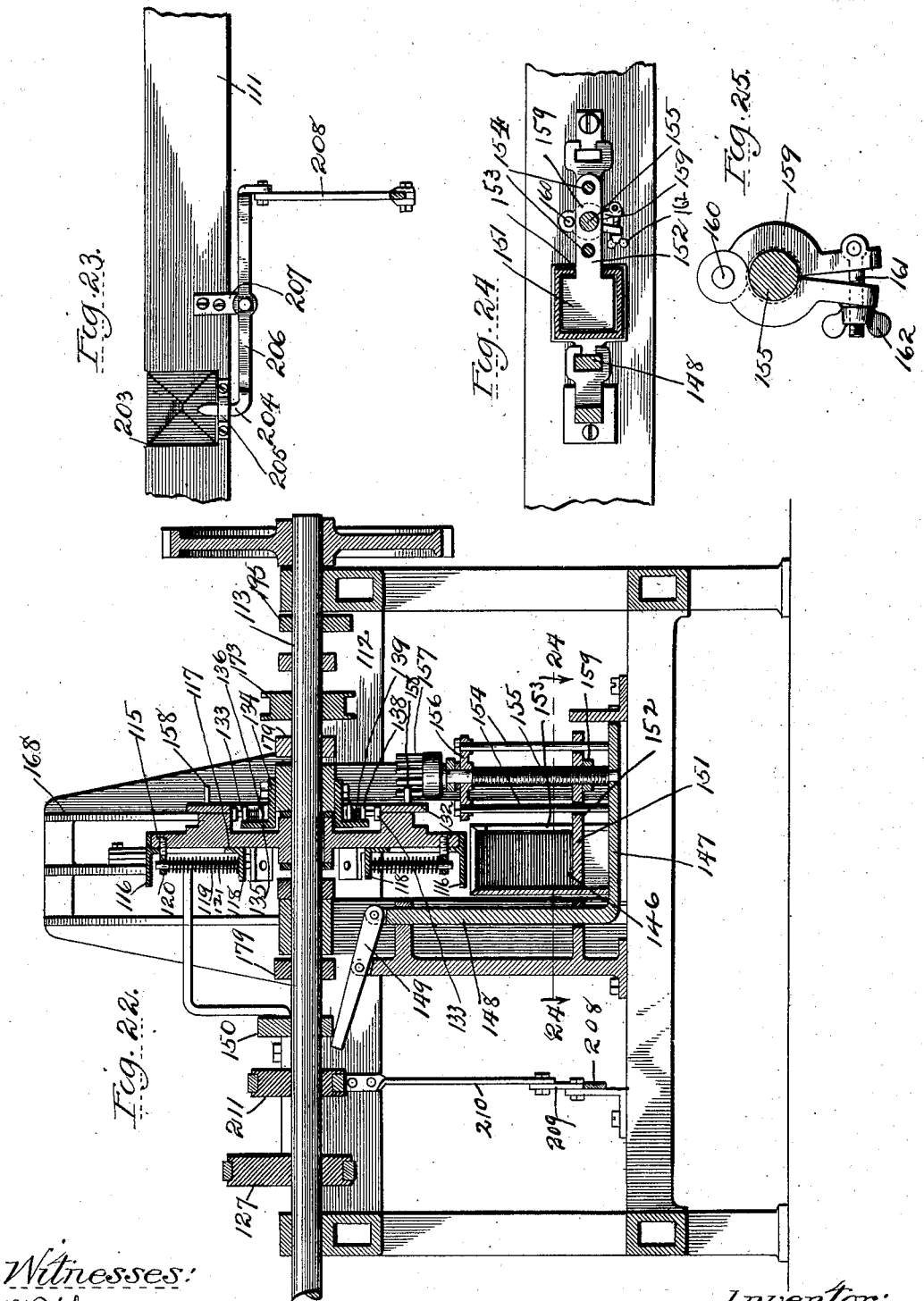
Witnesses:
Inventor:
David F. Bremner Jr.
By Offield, Towle & Linthicum Attys No. 753,661. Patented March 1, 1904.

UNITED STATES PATENT OFFICE.

DAVID F. BREMNER, JR., OF CHICAGO, ILLINOIS.

MACHINE FOR WRAPPING PACKAGES.

SPECIFICATION forming part of Letters Patent No. 753,661, dated March 1, 1904.

Application filed April 25, 1900. Serial No. 14,245. (No model.)

*To all whom it may concern:*

Be it known that I, DAVID F. BREMNER, Jr., a citizen of the United States, residing at Chicago, in the county of Cook and State of Illinois, have invented certain new and useful Improvements in Machines for Wrapping Packages, of which the following is a specification.

This invention relates to machines for wrapping packages, &c., and has for its object to provide an automatic mechanism whereby packages or other articles of regular form and size may have applied to them an inclosing wrapper which shall be folded around the package and secured in position by pasting or other means.

In its preferred form my invention contemplates a mechanism wherein the wrapper is wrapped around the body of the package and has its meeting edges secured together by paste or the like, the projecting ends of the wrapper being then folded and held in position by seals or labels pasted on said ends.

The ultimate object of the invention is to dispense with hand-labor in so far as possible and to substitute therefor automatic mechanical devices by means of which the packages may be wrapped more expeditiously and at a reduced cost.

To these ends my invention consists in certain novel features which I will now proceed to describe and will then particularly point out in the claims.

Figure 2:
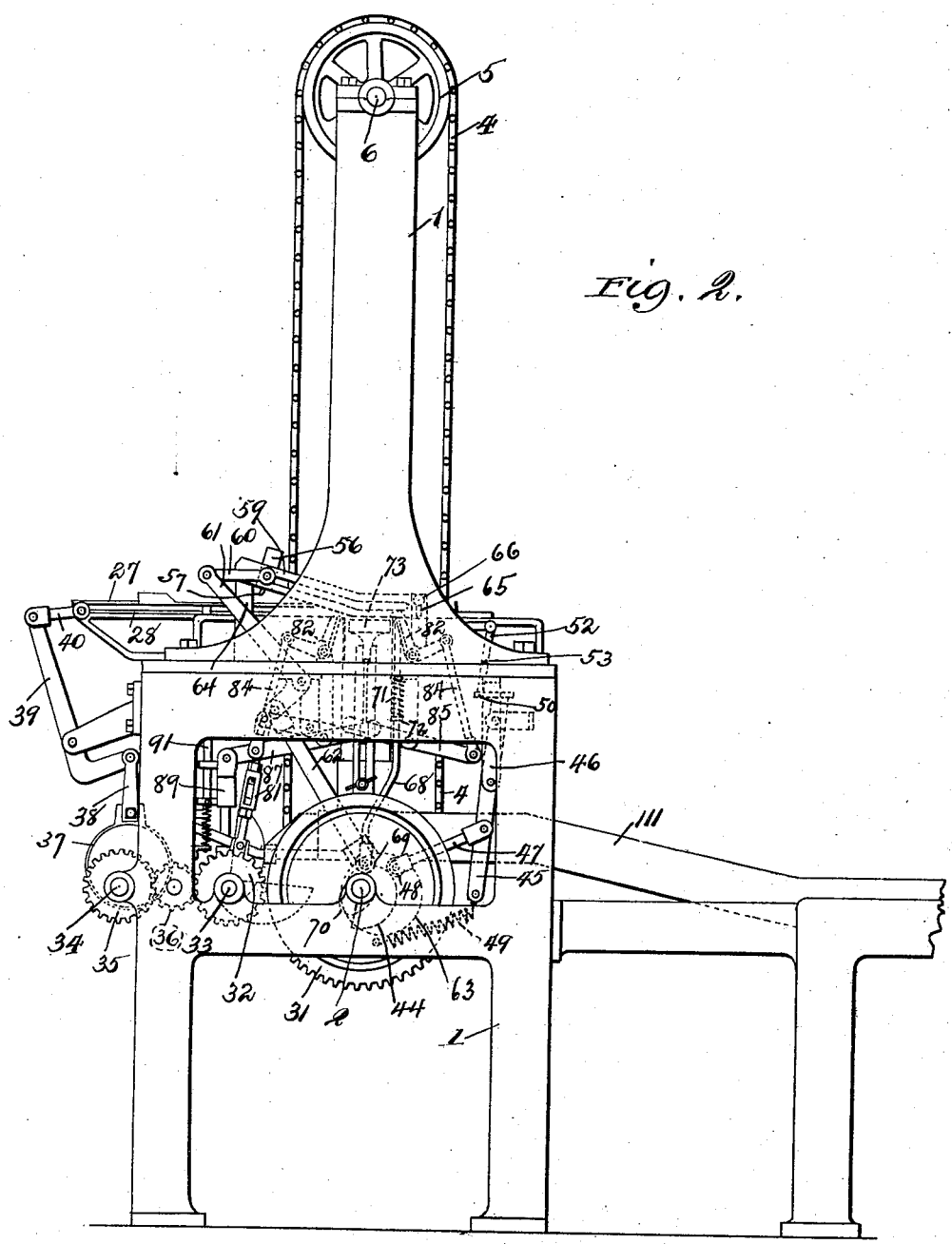
Figure 3:
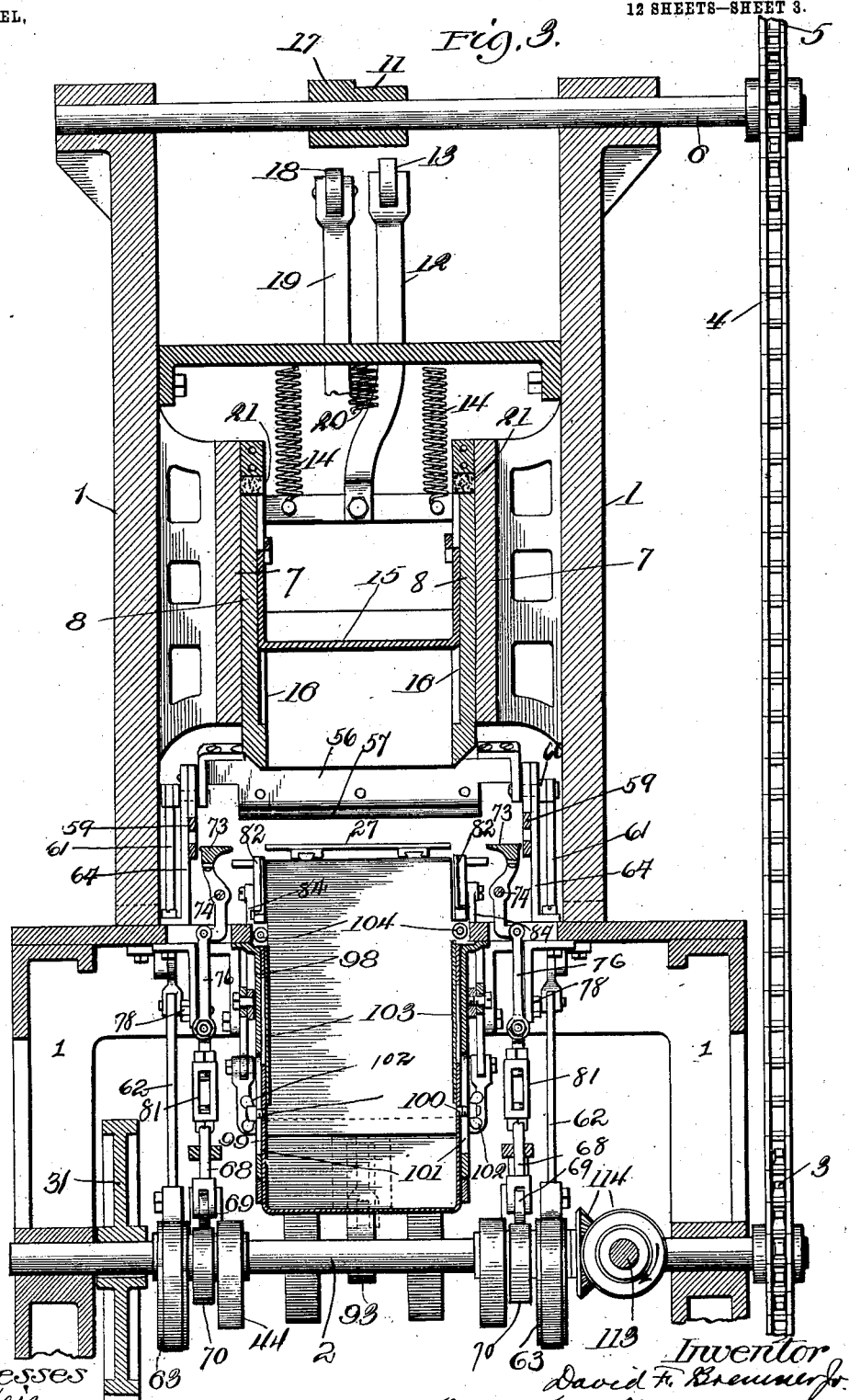
Figure 4:
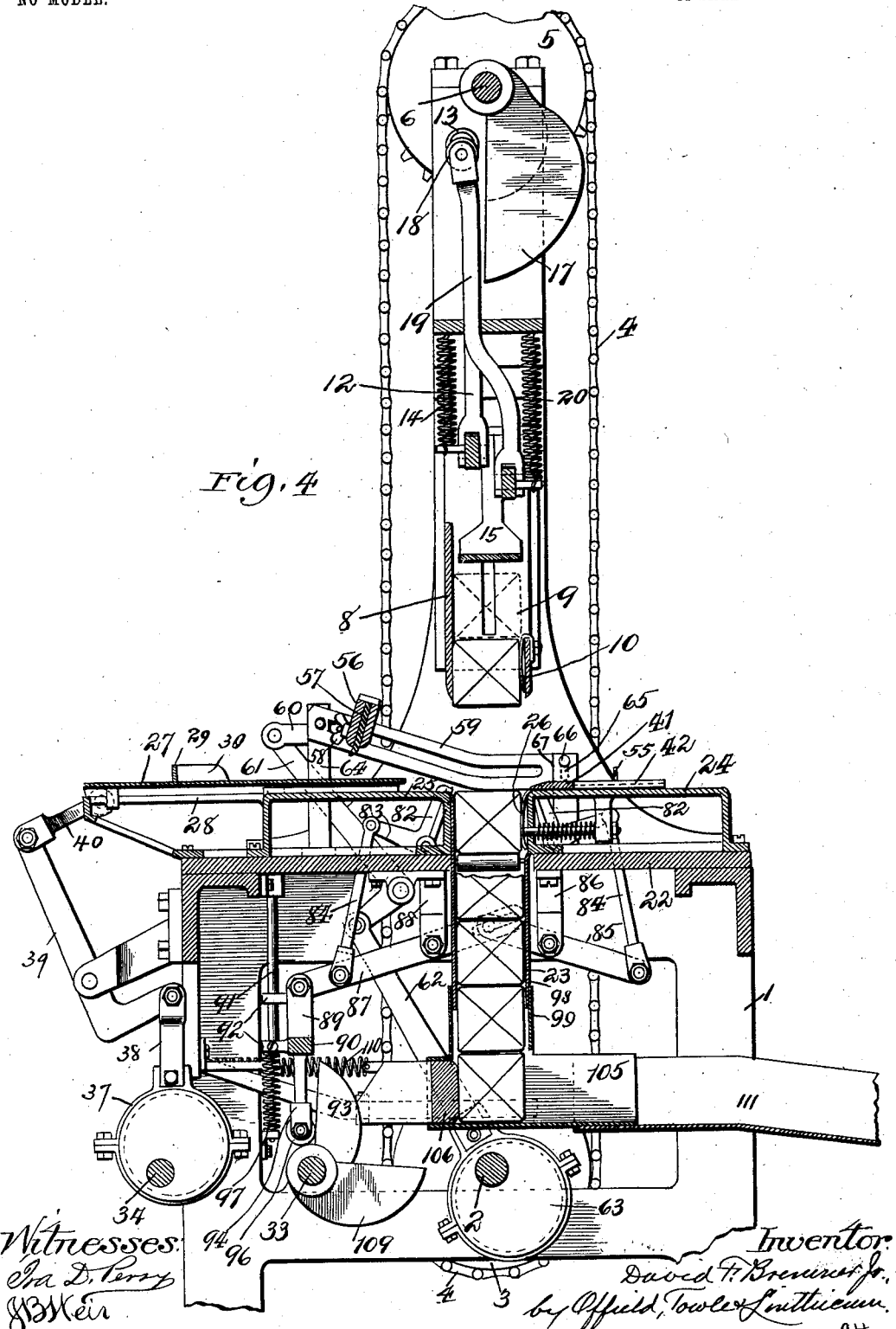
Figure 5:
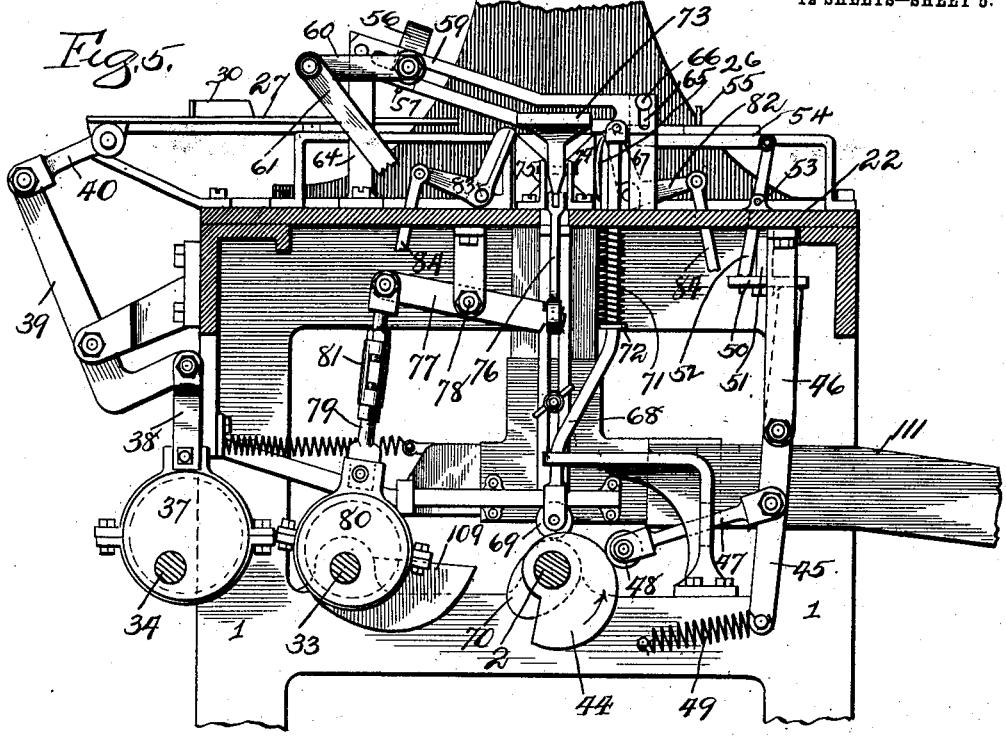
Figure 6:
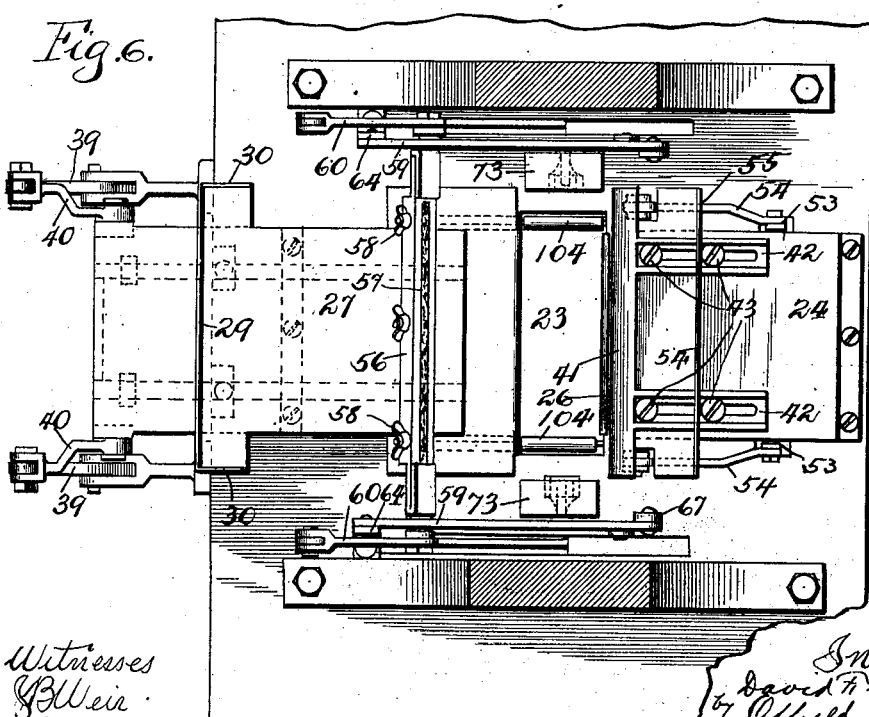
Figure 7:
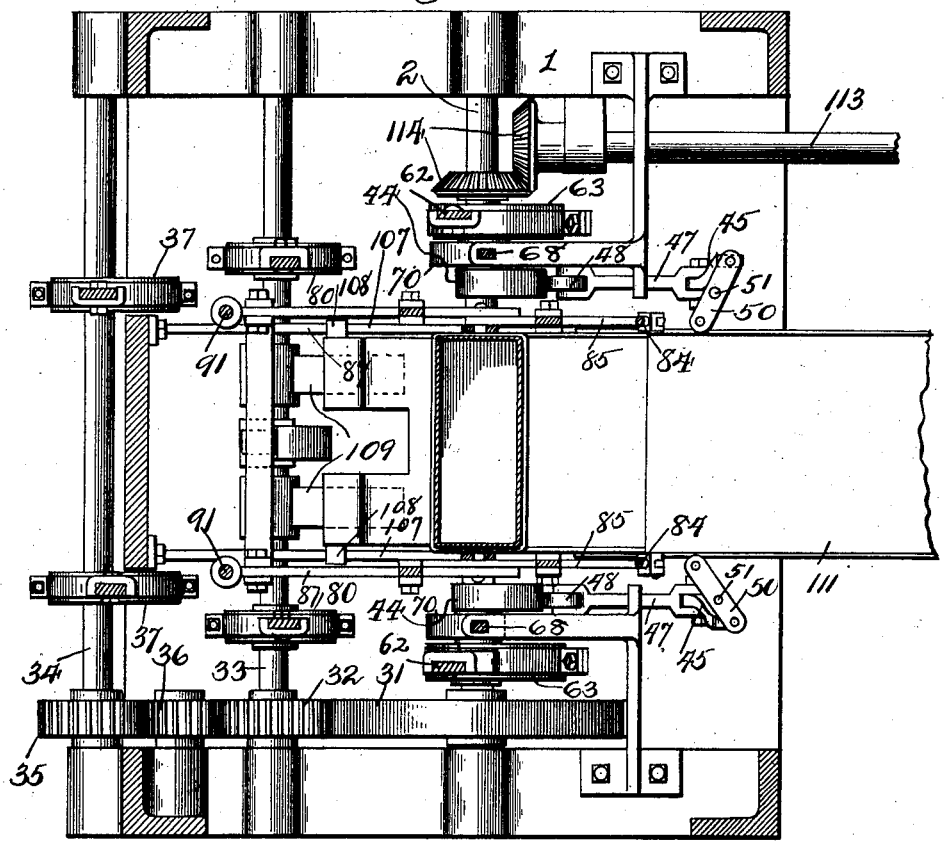
Figure 14:
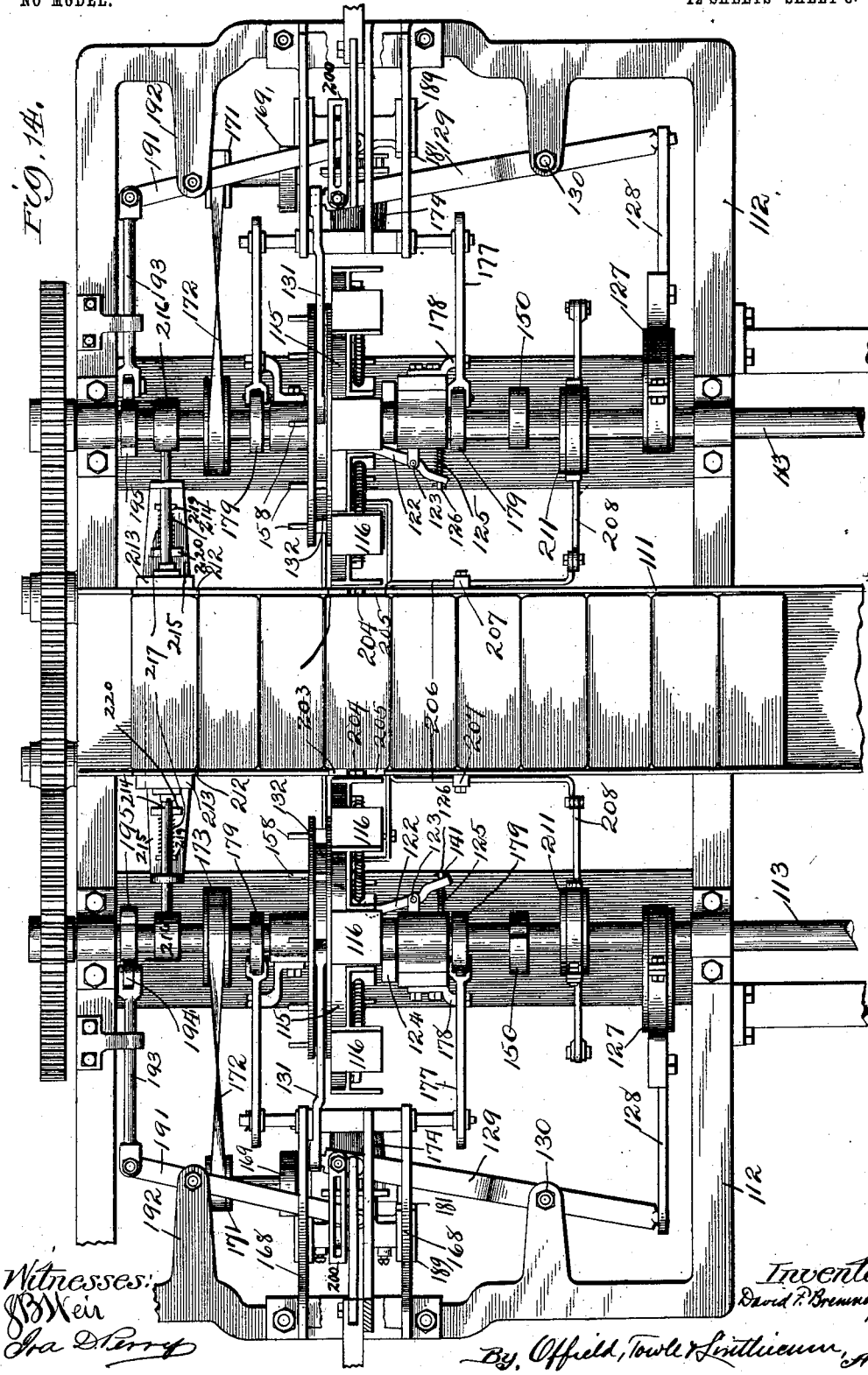

In the accompanying drawings, Figure 1 represents a front elevation of a machine embodying my invention. Fig. 2 is a side elevation of the folding mechanism. Fig. 3 is a vertical sectional view of the folding mechanism on an enlarged scale. Fig. 4 is a view similar to Fig. 3, but taken in a plane at right angles to the plane of section of said figure. Fig. 5 is a view similar to Fig. 4, but taken in a different plane parallel to the plane of section of Fig. 4. Fig. 6 is a plan section of the folder, taken above the bed-plate or table thereof. Fig. 7 is a view similar to Fig. 6, but taken below the bed-plate or table of the folder. Fig. 8 is a vertical sectional view through the folding devices, showing the position of the parts at the beginning of the operation of wrapping a package. Fig. 9 is a similar view showing the initial step of wrapping the package. Fig. 10 is a similar view showing the operation of folding the front edge or flap of the wrapper. Fig. 11 is a similar view showing the operation of folding the rear edge or flap of the wrapper. Fig. 12 is a section taken at right angles to Fig. 11 and showing the operation of folding the top portions of the projecting ends of the wrapper. Fig. 13 is an elevation, partly in section, showing the operation of folding the side portions of the projecting ends of the wrapper. Fig. 14 is a plan view of the seal attaching or labeling mechanism used in combination with the folding mechanism. Fig. 15 is a transverse vertical sectional view of the same. Fig. 16 is a detail sectional view of one side of the same, taken in a vertical plane and looking in the opposite direction to that in which Fig. 15 is viewed. Fig. 17 is a sectional view taken on the line 17 17 of Fig. 16 and looking in the direction of the arrow. Fig. 18 is a detail sectional view taken on the line 18 18 of Fig. 16 and looking in the direction of the arrow. Fig. 19 is a vertical sectional view through the seal or label pasting and applying mechanism at one side of the machine. Fig. 20 is an enlarged plan view of a portion of the paste-applying mechanism. Fig. 21 is a detail sectional view, on an enlarged scale, taken in a vertical plane through the pressing mechanism. Fig. 22 is a vertical sectional view, taken longitudinally of one of the cam-shafts of the labeling mechanism. Fig. 23 is a detail elevation of one of the folding retaining devices. Fig. 24 is a plan section, taken on the line 24 24 of Fig. 22; and Fig. 25 is an enlarged detail view of a portion of Fig. 24.

In the said drawings I have shown a machine in which the folding or wrapping mechanism proper is supported on a framework separate from but associated with that which supports the labeling or sealing mechanism. In describing my invention I will first describe the mechanism carried by this first-mentioned frame, (said frame being indicated as a whole by the reference-numeral 1,) which mechanism serves to wrap and fold the wrapper around the package or other article.

2 indicates the main shaft of the folder, which may be driven by power applied thereto from any suitable source and which is provided at one end with a sprocket-wheel 3, connected by a sprocket-chain 4 with a second sprocket-wheel 5, secured on a shaft 6, mounted in the upper portion of the frame 1. Said upper portion of the frame 1 is provided with vertical guideways 7, in which moves a vertically-reciprocating carrier 8. This carrier is hollow, being open at top and bottom and having its front side cut away or omitted, as indicated at 9, to permit the introduction of the packages by hand or otherwise. The carrier is internally of dimensions corresponding substantially with those of the package or article to be wrapped, and at its lower portion, below the receiving-aperture 9, the carrier is provided with a retaining spring or springs 10, by means of which the packages are held in position within the carrier. A vertical movement of reciprocation is imparted to the carrier by means of a cam 11, (indicated in dotted lines in Fig. 4,) secured on the shaft 6. The carrier is provided with an upwardly-extending arm 12, having at its upper end a roller 13, which bears against the cam 11, being held in contact therewith by means of springs 14, connected to the upper end of the carrier and to the main frame.

Within the carrier 8 there is mounted a plunger 15, adapted to move in suitable grooved ways 16 and having imparted to it a vertical reciprocating movement by means of a cam 17, secured on the shaft 6 and bearing against a roller 18 on the end of an upwardly-extending arm 19 of the plunger. The plunger is moved upward by means of a spring 20, connecting it with the main frame, said spring serving to hold the roller 18 in contact with the cam 17 during the operation of this latter. It will be observed that the cam 17 has a considerably greater throw than the cam 11, so that the total range of movement of the plunger is considerably greater than that of the carrier. It will also be noted that inasmuch as the cams 11 and 17 bear the same general angular relation to the shaft 6 upon which they are mounted the advance movement of the carrier and plunger will be synchronous, but at a differential rate, the cam 17 obviously imparting a much more rapid and greater throw to the plunger than that imparted to the carrier by its cam. Preferably, and as shown herein, the cams are so shaped that the plunger and carrier start in their advance movements simultaneously, or practically so, and complete their advance movement and return practically simultaneously.

It is not necessary that the rollers 13 and 18 should be at all times in contact with their actuating-cams, and as a matter of fact, in the construction shown, when the carrier and its plunger are at their upward limit of motion, as shown in Fig. 4, the said rollers are not in such contact. In order to provide suitable stops to limit the upward motion of the carrier and plunger when the machine is thus organized, I mount at the upper end of the guideways 7 buffers 21, of rubber or the like, with with which the upper end of the carrier will come in contact at the upward limit of its motion.

The lower or main portion of the frame 1 is provided with a table or base-plate 22, which is centrally apertured for the connection thereto of a chute 23, which extends downward therefrom. Above the table 22 there are mounted at the front and rear of the mouth of the chute 23 raised tables or platens 24 and 25, and in the particular construction shown the rear wall of the chute 23 extends upward to the top of the platen 25, while the platen 24 is provided with a spring-actuated holding-plate 26. The lateral end walls of the chute 23 terminate at about the level of the table 22, so that when the package is in position to be wrapped the ends of the package and of the wrapper are exposed and accessible.

The wrappers are fed into position over the mouth of the chute 23 upon the platens 24 and 25 by means of a wrapper-feeding plate 97, adapted to travel on suitable ways 28 and provided with a vertical gage-flange 29, which determines the position of the rear edge of the wrapper, and with lateral gage-flanges 30, which serve to properly center the wrapper. This wrapper-feeding plate is reciprocated in a horizontal plane by means of the following mechanism: The main shaft 2 is provided with a mutilated gear 31, (see Fig. 7,) with which meshes a pinion 32 on a counter-shaft 33. 34 indicates a second counter-shaft, provided with a pinion 35, driven from the pinion 32 by means of an intermediate pinion 36. The counter-shaft 34 is provided with eccentrics 37, each of which operates a pitman 38, which serves to vibrate a lever 39, (see Fig. 4,) connected by a link 40 with the rear end of the wrapper-feeding plate. By this means an intermittent motion of reciprocation will be imparted to the wrapper-feeding plate 27, whereby a wrapper placed upon said plate will at the proper time be projected over the mouth of the chute 23 and will lie across said mouth. The return movement of the feeding-plate withdraws it from under the wrapper and out of the path of the packages. It may be explained at this point that the operator holds the wrapper against being carried back by the feeding-plate by simply placing his fingers slightly upon the wrapper after it has been carried to position and during the return movement of the feeding-plate. The grasping and holding of the wrapper in this manner might obviously be accomplished by automatic means; but in practice this has not been found necessary. Upon the opposite or front side of the mouth of the chute 23 there is mounted on the bed or platen 24 a folding-blade 41, which is adapted to reciprocate horizontally on said bed or platen and to be projected over the mouth of the chute 23. This blade is preferably beveled on the upper side of its working edge, as shown, and in the present instance is guided on the bed by means of slotted arms 42, through the slots of which guiding-screws 43 extend into the bed. Motion is imparted to this folding-blade from the main driving-shaft 2 by means of cams 44 thereon. Each cam 44 has coöperating with it a lever 45, pivoted between its ends to a bracket-arm 46 and having a pivoted link 47, provided with a roller 48, which bears against the corresponding cam 44, being held in contact therewith by a spring 49, connected to the lower end of the lever 45 and to the frame. The upper end of each lever 45 is pivotally connected to one end of a horizontal lever 50, itself pivoted at its center on a stud 51 and having its other end pivotally connected to the lower end of an upright lever 52, which is pivoted between its ends on the table 22, as shown at 53. The upper end of each lever 52 is connected by a link 54 with one end of the folding-blade 41. By this means a horizontal reciprocation will be imparted to the folding-blade, so that it will be projected over the mouth of the chute 23 and will then be withdrawn.

I provide the folding-blade 41 with a vertical flange or rib 55, which acts as a gage to positively determine the position of the front edge of the wrapper before the operation of folding begins.

In order to provide for the folding of the rear edge of the wrapper, I employ a wiper 56, the same being preferably a transverse frame slotted longitudinally from top to bottom to receive therein a sheet of rubber 57, which is secured by clamping-nuts 58. The lower projecting edge of this sheet of rubber forms the actual wiper which contacts with the paper. The wiper 56 travels in guideways 59 on each side of the machine, these guideways being inclined downward and forward for a portion of their length and extending thence horizontally to a point slightly beyond the front wall of the chute 23. The guideways are slotted and the extremities of the wiper pass through and fit within said slots and are projected beyond the same for the attachment thereto of one end of the actuating-links 60. Each link 60 is connected at its other end to the upper end of a bell-crank lever 61, and to the lower end of said bell-crank lever is connected the upper end of a pitman 62, operated by an eccentric 63 on the main shaft 2. It will be seen that by these means the wiper will be moved first downward and forward over the mouth of the chute 23 and then rearward and upward to its original position. In order to insure a proper clearance upon this return movement, provision is made for lifting the wiper at the beginning of said movement, and to this end each of the guideways 59 is pivoted at its rear end to a suitable support 64, while its front end is slotted, as indicated at 65, to receive a pin or projection 66 on a post 67, carried by the table 22. To the front end of each guide 59 is pivoted the upper end of a rod 68, the lower end whereof is provided with a roller 69, which bears on a cam 70 on the shaft 2, being held in contact therewith by a spring 71, interposed between the table 22 and a collar 72 on the rod 68. By this means the front ends of the guides are lifted at the beginning of the return stroke of the wiper, so as to cause this latter to clear the work.

The end-folding devices are as follows: The top portion of the end of the wrapper is folded by means of a blade 73, two of these blades being employed, one at each side of the mouth of the chute 23, and said blades being mounted on horizontal pivots 74, carried by brackets 75 on the table 22, as shown more particularly in Fig. 5. The table 22 is slotted below each blade 73 for the passage of a link 76, (see Fig. 12,) connected at its upper end to the shank of the folding-blade 73, while its lower end is connected to one end of a lever 77, pivoted between its two ends to a bracket 78 on the under side of the table 22. The other end of the lever 77 is connected, by means of a pitman 79, with an eccentric 80 on the shaft 33. I prefer to make each pitman 79 adjustable in length by constructing it in two parts having threaded ends united by a turnbuckle 81. The shaft 33 is intermittently rotated in the manner hereinbefore described, and at each rotation the eccentrics 80 will, through the medium of the connecting mechanism just described, swing the folding-blades 73 inward and downward along the ends of the mouth of the chute and will then return them to their normal position, as shown in Figs. 3, 5, and 6, for instance.

The folding mechanism for folding the sides of the projecting ends of the wrappers consists of folding-blades 82, located in pairs at each side of each end of the chute 23, so as to swing in the plane of the end walls of the chute. Each blade is provided with a shank 83, to which is connected the upper end of a link 84. One of the links 84 is pivoted to one end of a lever 85, which is itself centrally pivoted to a bracket 86, extending downwardly from the bed 22. The other link 84 is similarly connected to a lever 87, carried by a similar bracket 88, and the two inner adjacent ends of said levers are connected by a pin-and-slot connection, as indicated in dotted lines in Fig. 4. The lever 87 is extended beyond its connection with the link 84, and its free end is connected to an upright 89 on one end of a vertically-reciprocating cross-bar 90. The pair of folding-blades at one end of the chute 23 are connected to one end of said cross-bar, while the pair at the other end of the chute are similarly connected to the other end of said cross-bar. The cross-bar is guided by vertical rods 91, which extend through lugs 92 on the cross-bar and on its uprights 89. Vertical movement is intermittently imparted to the cross-bar 90 by means of a cam 93 on the shaft 33, the cross-bar being provided with a central downwardly-extending arm 94, provided with a roller 96, which is held against the cam by a spring 97.

The chute, which I have designated as a whole by the reference-numeral 23, preferably consists of an upper portion 98 and a lower portion 99, telescoping within said upper portion and adjustable therein. To this end the lower portion of the chute is provided with screw-bolts 100, (see Fig. 3,) which extend through slots 101 in the upper portion and are provided with clamping-nuts 102 to secure the two sections of the chute together after adjustment. The inner faces of the chute may be provided with wearing-plates 103, of brass or the like, and I prefer to employ at each end of the mouth of the chute a roller 104, whose outer face is flush with the surface of the end wall of the chute. At its lower end the chute 23 communicates with a horizontal conduit 105, said conduit being open at its rear end and being there provided with a plunger 106, which is reciprocated horizontally in said conduit across the lower end of the chute 23. The plunger 106 is supported on guideways 107 by means of loops 108 and is actuated by cams 109 on the shaft 33, the rear end of said plunger being held against said cams by means of springs 110. The horizontal conduit 105 communicates with a partially-horizontal and partially-inclined conduit 111, through which the packages are conducted from the folding and wrapping mechanism to the sealing or labeling mechanism.

The folding and wrapping mechanism just described operates in the following manner: The parts being in the position shown in Figs. 1 to 7, a wrapping-sheet or wrapper is laid upon the plate 27 and is carried by said plate across the mouth of the chute 23 and there deposited. The upper rear edge of the sheet is provided with a coating of paste or the like prior to the folding operations, such paste being applied in any suitable manner and by any suitable means. The lower portion of the carrier has placed within it a package or other article to be wrapped, as indicated in full lines in Fig. 4 of the drawings, and a second package is placed in said carrier above the first package, as indicated in dotted lines in Fig. 4. The carrier and its plunger then descend, and the package in the lower portion of the carrier is forced downward into the mouth of the chute 23 by the action of the plunger on the package above it, as indicated in Fig. 9 of the drawings. The wrapper is drawn down into the mouth of the chute, as indicated in said figure, so that it surrounds three sides of the package, and has a short upwardly-projecting front edge and a comparatively long upwardly-projecting rear edge. The wrapper being of greater width than the length of the package, its ends must project beyond the end walls of the chute 23, which are open at the top for this purpose. The folding-blade 41 is then projected over the mouth of the chute, as indicated in Fig. 10, and folds down the front edge of the wrapper over the top of the package. In the meantime the wiper 56 has been moving downward and forward and folds the edge of the wrapper upon the top of the package, following closely the retreating folding-blade 41 and pressing the pasted rear edge of the wrapper upon the front edge, which has just been folded down by the blade 41. By this means the joint of the wrapper comes at the corner of the package, and no paste comes in contact with the package, but is used only between the two edges of the wrapper. As soon as the wiper has completed its forward movement the front ends of the guideways 59 are lifted, so that the wiper passes clear of the work during its return movement, and is thus prevented from dragging over the same and tearing apart the freshly-pasted joint. The top portions of the projecting ends of the wrapper are next folded down by means of the blades 73, as indicated in Fig. 12 of the drawings, and as soon as this has been accomplished the front and rear portions of the projecting ends of the wrapper are folded in against the package by means of the blades 82. By this time another wrapper has been placed across the mouth of the chute and the carrier has reascended and its plunger has been again raised, so that another package may be inserted above the one in the lower portion of the carrier. The carrier then descends again and its plunger forces a second package into the mouth of the chute 23. This latter package in turn forces down the first package past the rollers 104 and into the body of the chute, and this downward movement folds the lowermost flaps of the projecting ends of the wrapper and completes the operation of wrapping and folding the wrapper around the package. The packages fit somewhat snugly within the chute 23 and accumulate therein until the lowermost one rests in the horizontal conduit 105. The parts are so timed that after the introduction of a fresh package into the upper end of the chute the plunger 106 proceeds to propel the lowermost package horizontally along the conduit 105 and returns to its position in time to permit the introduction of the next package into the chute to force down the lowermost package in front of said plunger. The packages are thus fed step by step along the conduits 105 and 111 to the sealing or labeling mechanism.

The folded ends of the wrappers are held in place by seals or labels pasted over said folded ends, and I have devised for the purpose of applying said seals or labels the mechanism shown in detail in Figs. 14 to 25, inclusive, of the drawings. This labeling mechanism forms the subject of a divisional application, Serial No. 139,245, filed January 15, 1903, and is therefore not claimed independently herein. Said mechanism comprises a frame 112, upon which the various parts of the structure are supported, the conduit 111 extending centrally across the top of said frame. The seal-applying mechanism is arranged in duplicate on opposite sides of said conduit, and I will describe the construction of only one of said mechanisms, it being understood that the same description is equally applicable to the other. 113 indicates a shaft which is driven from the main shaft 2 by means of beveled gears 114 and which is mounted in suitable bearings on the frame 112. Upon the shaft 113 there is loosely mounted a wheel or carrier 115, rotating intermittently in a vertical plane and adapted to take the labels from the magazine one by one, hold them while the paste is being applied to their exposed faces, and then press them against the end of the package to secure them in position. To this end the wheel 115 is provided at its periphery with a plurality of label-carrying plates 116. Each plate 116 is mounted on a slide 117, adapted to slide on the face of the wheel or carrier 115, and provided at its inner end with a flange or right-angled extension 118. This flange carries a guide-rod 119, which passes through an aperture in a lug 120, secured to the wheel 115, a spring 121 being mounted on said rod between said lug and flange. The carrying-plates are normally held against the periphery of the wheel by the springs 121, but are adapted to be thrust radially outward at the proper time by means of a lever 122, one end of which is adapted to contact with the flange 118 of the slide, which happens to be in the path of said lever when the wheel or carrier is stationary. The lever 122 is pivoted at 123 and is actuated by a cam 124 on said shaft. A spring 125, mounted on a guide-rod 126, serves to hold the lever normally out of engagement with the slide and in the path of the cam 124. An intermittent movement of rotation is imparted to the wheel or carrier 115 by means of the following mechanism: An eccentric 127, secured on the shaft 113, has its pitman 128 connected to one end of a lever 129, which is pivoted at 130 on a bracket or extension of the frame 112. This lever is bent upward, as indicated more particularly in Fig. 17, and there is connected to its other end a pawl-arm 131, which engages with a ratchet-wheel 132, formed on the face of the wheel or carrier 115. In order to insure the arrest of the wheel as soon as the pawl has ceased to act, I employ friction-shoes 133, which press against the inner wall of the hub of the wheel or carrier, which is hollowed out to receive said friction-shoes and provide a bearing-surface for the same. These friction-shoes are carried by a sleeve 134, secured to one of the bearings of the shaft 113 and having a terminal flange 135, annular in form and lying within the recess in the hub of the wheel or carrier 115. This annular flange carries lugs 136, in which are mounted the rods 137, which form the stems of the friction-shoes, each of said rods being provided with a collar 138 and with a spring 139, coiled around said rod between said lug and collar. In order to cause the labels to adhere temporarily to the carrying-plates 116, I wet or moisten these plates prior to the application of the labels, and for this purpose I provide a water trough or tank 140, which is carried by means of brackets 141, mounted to slide on rods 142, extending upward from the base of the machine and provided with supporting-springs 143. This tank is supplied with water in any suitable manner, and there is mounted therein at each end a wheel 144, provided with an absorbent periphery 145 and held in the path of and against the carrying-plates 116 by means of the springs 143. It will be seen that as each plate wipes over the wheel its surface will be moistened. The labels are supplied to the wheel by means of the following mechanism: Immediately below the wheel is located a suitable magazine or hopper 146, in which the labels are piled one on top of another. This magazine is mounted on a support 147, having an upwardly-extending arm 148 passing through suitable guides on the frame of the machine and pivotally connected at its upper end to one end of a lever 149, the other end of said lever lying in the path of a cam 150 upon the shaft 113. By reason of this construction the support 147 is vertically reciprocated, and each upward movement brings the top of the magazine up to and past the carrying-plate 116, which is lowermost on the wheel or carrier 115. The uppermost label is thereby brought into contact with the wetted surface of said carrying-plate and caused to adhere thereto, the magazine descending again after the label has been applied to the plate. As the pile of labels in the magazine diminishes in height it is necessary to provide for the lifting of the pile, so that the uppermost label will always be in proper position to contact with the carrying-plate, and for this purpose I provide the magazine with a false bottom 151, having an extension 152, which passes through a vertical slot 153 in the side of the magazine. This extension is apertured to fit upon two vertical guide-rods 154, upon which the extension slides, and is further apertured for the free passage of a vertical feed-screw 155, mounted in suitable bearings in the support 147 and in a cross-piece 156 on the upper ends of the guide-rods 154. The feed-screw 155 is provided at its upper end with a pin-wheel 157, actuated by means of pins 158, projecting from the lateral face of the wheel or carrier 115. Below the extension 152 of the false bottom 151 there is mounted on the feed-screw 155 a nut 159, which is preferably constructed in the manner shown in detail in Figs. 24 and 25. The nut is made in two sections hinged together by a pintle 160, while at the other end the sections are provided with lugs, to one of which is pivoted a bolt 161, which passes through the other and receives a thumb-nut 162. In the particular construction shown the nut is not connected with the extension, but is prevented from rotating by its frictional contact therewith and by reason of the contact of its projecting portions with the guide-rods 154. It will be seen that as the wheel or carrier 115 rotates it will rotate the feed-screw 155, and thus cause a slow upward movement of the false bottom 151, thereby maintaining the top of the pile of labels in the magazine at the proper height therein. When it is desired to fill the magazine, the false bottom may be rapidly lowered by releasing the split nut 159 from engagement with the thread of the feed-screw.

In order to apply paste to the exposed face of the label, I employ the mechanism shown more particularly in Figs. 16 to 21 of the drawings. In this construction, 163 represents a paste-tank, suitably supported from the frame of the machine and having mounted therein a paste-roller 164, running in the paste in the tank and having above it and in contact with it a tempering-roller 165, above which and in contact with it is a distributing-roller 166. These rollers are mounted in a U-shaped bracket or stirrup 167, forming a part of and depending from an auxiliary frame 168, mounted on the main frame 113, said stirrup or bracket also serving to aid in supporting the paste-trough 163. The rollers are driven by means of a belt 169, which passes around pulleys 170 on the shafts of the rollers, as indicated in Figs. 16 and 18, and the shaft of the roller 164 is extended and provided with a pulley 171, driven by a cross-belt 172 from a pulley 173 on the shaft 113. In conjunction with the paste-rollers I employ a paste-brush, whereby the paste is transferred from the rollers to the paste-applying pad. This brush, which is indicated at 174, is carried by a holder 175, adapted to reciprocate in vertical ways 176, formed in a part of the auxiliary frame 168. Vertical movement is imparted to the brush-holder and brush by means of levers 177, pivoted on arms 178, carried by the bearings of the shaft 113 and having their slotted outer ends engaged with the extended ends of the brush-holder, while their inner ends are arranged in the path of cams 179 on the shaft 113. Located above the paste-rollers and in the path of the brush 174 is the paste-applying pad 180. This pad is mounted on the forward end of a cross-head 181, adapted to reciprocate in suitable horizontal ways 182, formed in the auxiliary frame 168, motion being imparted to said cross-head by means of a link 183, pivoted at one end to the cross-head and having at the other end a pin-and-slot connection with one end of a bell-crank lever 184, the other end of said bell-crank lever being connected by a link 185 with a lug 186 on the lever 129. By reason of this construction the pad while stationary is supplied with paste by means of the brush 174 and is then moved forward until it comes into contact with the label which lies in front of it on the adjacent carrying-plate 116 of the wheel or carrier 115. Paste having thus been applied to the exposed surface of the label, the pad recedes to its original position to receive another coating of paste. In order to prevent the label from adhering to and being withdrawn along with the pad, I provide a plurality of doffing pins or fingers 187. These pins extend through suitable apertures in the pad, being longitudinally movable therethrough, and are mounted on a plate 188, which plate is in turn mounted on a second cross-head 189, adapted to reciprocate horizontally in suitable ways 190 in the frame 168. This cross-head is actuated in one direction by means of a lever 191, pivoted on an arm or extension 192 from the frame 112 and connected with a rod 193, provided with a roller 194, which is acted on by a cam 195 on the shaft 113. This mechanism operates to thrust the pins forward and hold them against the label as it lies on the carrying-plate, and the parts are so timed that the label is thus held until after the paste-pad has been withdrawn, so that the label is prevented from adhering to the pad and being withdrawn along with the same. The doffing-fingers are operated in the opposite direction by means of a link 196, pivotally connected to the cross-head 189 and to the lower end of a lever 197, pivoted to a bracket 198 on the frame 168. The lever 197 is provided at its upper end with a hooked portion or shoulder 199 and passes through a slotted arm 200, which is secured to the lever 129. When the lever moves forward and inward to actuate the wheel or carrier 115, the end of the slot in the arm 200 will engage the shoulder 199 of the lever 197 and will retract the cross-head 189 and withdraw the pins to the position shown in Figs. 19 and 20, in which position they do not project beyond the base of the pad, and consequently do not interfere with the application of paste thereto. The cross-head 181 is provided with upwardly-extending lugs 201, through which pass screws 202, which bear against the rear edge of the upper cross-head 189 and which form stops to limit the motion of said upper cross-head, and consequently of the doffing-pins, said stops being adjustable, so as to properly determine the relative position of the pins to the pad when retracted.

In order to permit the application of the labels to the ends of the packages, the conduit 111 is cut away on each side at points directly opposite each other, as indicated at 203, and in order to prevent the folded ends of the wrapper from opening out when the packages come opposite these cut-away portions and before the labels have been applied thereto I provide a flap-retaining finger 204 at each side of the conduit, which serves to hold the lowermost flap in position, as indicated in Fig. 23, until the application of the label, it being understood that since the lowermost flap is the one last folded the other flaps are also held flat against the end of the package. The finger 204 passes through a guide or keeper 205 on the lower portion of the side wall of the conduit and is attached to or formed in one piece with one end of a lever 206, pivotally mounted on a support or bracket 207 on the conduit. To the other end of the lever 206 there is connected a link 208, which is also connected with one end of a lever 209, centrally pivoted on the frame of the machine and having its other end pivotally connected with a pitman 210, operated by an eccentric 211 on the shaft 113. By this means the flap-retaining finger is withdrawn during the application of the pasted label and advanced to hold the flap of the next package in proper position until the next label-applying operation.

I have found it desirable after the labels have been applied to the ends of the package to subject them to a second and final pressure after the paste has become somewhat set in order to insure their adhesion, and for this purpose I provide pressing devices on each side of the conduit 111, which is cut away on each side, as shown at 212, to give access to the packages. One of these pressing devices is shown in detail in Fig. 21 of the drawings and consists of a platen 213, provided with a stem 214, passing through a guiding-bracket 215 and having its free end bearing against a cam 216 on the shaft 113. The stem is held against the cam by means of a spring 217, coiled around a rod 218, secured to the platen 213, said spring bearing against a collar 219 on said rod and against a standard 220, through which the rod passes. While each package remains stationary, with its ends exposed through the openings 212, the cams 216 press the platens forward, so as to give a final pressure to the labels on the ends of the package, and thereby insure their proper adhesion.

From the foregoing description of the details of the labeling mechanism it will be understood that as the packages advance step by step and successively come opposite the openings 203 in the sides of the conduit the pasted labels are applied simultaneously to the two ends of the package and serve to permanently hold the folded ends of the wrapper in position. The labels are carried from the magazine in the manner described in detail by the wetted surfaces of the label-carrying plates and are supplied with paste on their exposed faces and at the same time prevented from adhering to the paste-pad. The pressing of the carrying-plates against the ends of the package serves to cause the labels to adhere more firmly to the package than to the plates, so that when the plates are withdrawn the labels remain attached to the package. The final pressure by means of the platens 213 serves to insure the proper and firm adhesion of the labels, and the packages are finally discharged from the machine at the end of the conduit 111 in a finished condition, completely wrapped and labeled and ready for the market. In describing the construction and operation of this portion of my apparatus I have referred to the small sheets of paper which are pasted over the ends of the package as "labels," for the reason that they may contain printed matter, either text or pictorial, and will thus serve as labels for the package. They have, however, a sealing function in their relation to the mechanical structure of the package, and I therefore wish it understood that I include in the term "label" as I have used it such a sheet of paper or other like material as will act as a seal, whether it bears any printed matter or not.

The apparatus as a whole serves to automatically wrap and fold the wrapper around the package and to apply the seals or labels to the ends of the package to complete the same, the work being done expeditiously and with certainty and much more rapidly and at less expense than if done by hand-labor.

I have described one embodiment of my invention; but the details of the structure constituting this embodiment may obviously be varied without departing from the principle of my invention, and I therefore do not wish to be understood as limiting myself to the precise details hereinbefore set forth, and shown in the accompanying drawings.

I claim—

1. A machine for wrapping and labeling packages, comprising a wrapping mechanism consisting of a vertical chute, a carrier and plunger for intermittently feeding the packages through said chute, means for wrapping and folding a wrapper around each package during its passage through said chute, a horizontal conduit connected with said chute, constructed to fit the sides of the packages closely so as to retain the folds of the wrapper in position, a plunger for intermittently feeding the wrapped packages along said conduit and means located at the sides of the conduit and intermediate the length of the latter for applying labels to the ends of the packages while they are still within the conduit, substantially as described.

2. In a machine for wrapping packages, the combination with a wrapping and folding mechanism, of a continuous conduit for receiving and supporting the package and retaining the folds of the wrapper, and means for applying adhesive seals or labels to the folded ends of the packages while within the conduit, said conduit being cut away at the points where the folding and labeling mechanisms are located to afford access to the packages, substantially as described.

3. In a machine for wrapping packages, the combination with a vertical chute, of means for feeding the wrapper over the mouth of said chute, a package-carrier reciprocating vertically toward and from said chute, means holding the package frictionally and yieldingly within the carrier, and a plunger having a differential motion relatively to said carrier and moving in the same direction therewith and adapted to positively eject the packages from the carrier and force them together with their wrappers into the chute, substantially as described.

4. In a machine for wrapping packages, the combination with a vertical wrapping-chute, of a wrapper-feeding plate forming a carrier upon which the wrapper is supported throughout its principal length, means for reciprocating said wrapper-feeding plate across the mouth of said chute and a stop or gage arranged to arrest and determine the position of the front end of the wrapper, substantially as described.

5. In a machine for wrapping packages, the combination with a vertical wrapping-chute, of a wrapper-feeding plate forming a carrier upon which the wrapper is supported throughout its principal length, mechanism for reciprocating said wrapper-feeding plate across the mouth of said chute and lateral and transverse gages coöperating with the wrapper-feeding plate to determine the position of the wrapper relatively to the chute, substantially as described.

6. In a machine for wrapping packages, the combination, with a wrapping-chute, of a wrapper-feeding plate reciprocating across the mouth of said chute from one side, a folding blade or wiper adapted to be projected over said chute from the opposite side, a second folding blade or wiper adapted to be projected over the mouth of said chute from the same side as the wrapper-feeding plate, and means for lifting said last-mentioned blade or wiper to clear the feeding-plate, substantially as described.

7. In a machine for wrapping packages, the combination, with a wrapping-chute, of a blade or wiper adapted to be projected over the mouth of said chute to fold the forward end of the wrapper, a second wiper adapted to be reciprocated over the mouth of the chute to fold the rear edge of the wrapper, and means for lifting said second wiper during its return movement, substantially as described.

8. In a machine for wrapping packages, the combination, with means for folding a wrapper around the sides and at the ends of a package, of means for applying to the folded ends adhesive seals or labels, said means comprising intermittently-rotating carriers provided with radially-movable label-carrying plates, substantially as described.

9. In a machine for wrapping packages, the combination, with means for folding a wrapper around the sides and at the ends of a package, of means for applying to the folded ends adhesive seals or labels, said means comprising intermittently-rotating carriers provided with radially-movable label-carrying plates, means for feeding the labels to said plates, and means for applying paste to the labels, substantially as described.

10. In a machine for wrapping packages, the combination, with means for folding a wrapper around the sides and at the ends of a package, of means for applying to the folded ends adhesive seals or labels, said means comprising intermittently-rotating carriers provided with label-carrying plates, means for moistening said plates to cause a temporary adherence of the labels thereto, means for feeding the labels to the moistened plates, and pasting mechanism for applying the adhesive to said labels while on said carrying-plates, substantially as described.

11. In a machine of the character described, the combination with means for folding a wrapper around a package, of a substantially horizontal conduit having its lateral walls cut away at opposite points, fold-retaining fingers located at said cut-away portions, label-applying mechanisms located on each side of the conduit at said cut-away portions, and means for intermittently feeding the packages through said conduit, substantially as described.

12. In a machine of the character described, the combination, with means for folding a wrapper around a package, of a substantially horizontal conduit having its lateral walls cut away at opposite points, of flap-retaining fingers located at said cut-away points, means for retracting and advancing said fingers, label-applying mechanisms located on each side of the conduit at said cut-away portions and adapted to apply the labels when the fingers are retracted, and means for intermittently feeding the packages through said conduit, substantially as described.

13. In a machine of the character described, the combination, with a hollow carrier, and a plunger working within said carrier, of means for imparting a synchronous but differential movement to the carrier and plunger, as and for the purpose set forth.

14. In a machine of the character described, the combination with a hollow carrier, and a plunger working within said carrier, of means for imparting a synchronous but differential movement to the carrier and plunger, comprising a continuously-rotating shaft, cams upon said shaft and arms connected with the carrier and plunger respectively and operatively engaged with said cams, as and for the purpose set forth.

15. In a machine of the character described, a vertically-disposed hollow carrier provided with a lateral opening through which a package may be inserted, means for holding said package frictionally within the carrier, a plunger adapted to force the package from the carrier and operative connections for imparting a synchronous but differential movement to the carrier and plunger, substantially as described.

16. In a machine of the character described, the combination with a hollow carrier, means for holding a package yieldingly within said carrier, a plunger operating to thrust the package positively from the carrier, a vertically-disposed chute adapted to receive the package from the carrier, means for holding the package yieldingly in position within the mouth of the chute and folding mechanism arranged to wrap the package while thus held frictionally within the chute, substantially as described.

17. In a wrapping-machine adapted to operate upon packages having rectangular sides, the combination with means for holding the package in position while the initial folds of the wrapping are being formed, of end-folding devices comprising a blade of less width than the width of the package and operated to move across the end and adjacent to the package to close a portion of the upper side of the wrapper across the end of the package, a pair of laterally-disposed folders for forming second folds, comprising blades pivotally mounted to oscillate in a plane parallel with and adjacent to the end of the package, their pivotal axes being so located as to bring the folding-edges of the blades substantially into alinement with the bottom of said package when at the forward limits of their folding movement, whereby the side folds are formed, and means for forming the final folds, comprising end walls arranged parallel with the ends of the package and means for moving said package between said end walls in a relatively downward direction.

DAVID F. BREMNER, JR.

Witnesses:
IRVINE MILLER,
FREDERICK C. GOODWIN.